(12) United States Patent
Rush et al.

(10) Patent No.: US 7,761,056 B2
(45) Date of Patent: Jul. 20, 2010

(54) METHOD OF CONTROLLING A PROCESSOR FOR RADIO ISOLATION USING A TIMER

(75) Inventors: Frederick A. Rush, Austin, TX (US); G. Diwakar Vishakhadatta, Austin, TX (US); Phillip M. Matthews, Austin, TX (US)

(73) Assignee: ST-Ericsson SA, Geneva (CH)

( * ) Notice: Subject to any disclaimer, the term of this patent is extended or adjusted under 35 U.S.C. 154(b) by 1318 days.

(21) Appl. No.: 10/897,953

(22) Filed: Jul. 23, 2004

(65) Prior Publication Data

US 2006/0019686 A1 Jan. 26, 2006

(51) Int. Cl.
*H04B 1/00* (2006.01)
*H04B 1/38* (2006.01)

(52) U.S. Cl. ............ 455/63.1; 455/67.13; 455/78; 455/333; 375/219

(58) Field of Classification Search .......... 455/501, 455/63.1, 67.13, 73, 78, 333; 375/219
See application file for complete search history.

(56) References Cited

U.S. PATENT DOCUMENTS

| | | | |
|---|---|---|---|
| 4,384,361 A | 5/1983 | Masaki | |
| 4,805,165 A | 2/1989 | Kawanura et al. | |
| 4,870,699 A | 9/1989 | Garner et al. | |
| 4,879,758 A | 11/1989 | DeLuca et al. | |
| 4,930,126 A | 5/1990 | Kazecki et al. | |
| 4,996,639 A | 2/1991 | Ishimoto et al. | |
| 5,031,233 A | 7/1991 | Ragan | |
| 5,058,203 A | 10/1991 | Inagami | |
| 5,142,699 A | 8/1992 | Sato et al. | |
| 5,150,361 A | 9/1992 | Wiecaorek et al. | |
| 5,151,769 A | 9/1992 | Immorlica, Jr. et al. | |
| 5,212,796 A * | 5/1993 | Allison ............ | 710/264 |
| 5,241,541 A | 8/1993 | Farrell et al. | |
| 5,280,644 A | 1/1994 | Vannatta et al. | |
| 5,307,066 A | 4/1994 | Kobayashi et al. | |
| 5,355,524 A | 10/1994 | Higgins, Jr. | |
| 5,448,755 A | 9/1995 | Tanaka | |

(Continued)

FOREIGN PATENT DOCUMENTS

EP 0463621 6/1991

(Continued)

OTHER PUBLICATIONS

International Search Report for PCT/US05/35279, date of mailing: Jan. 27, 2006, 3 pages.

(Continued)

*Primary Examiner*—Quochien B Vuong
(74) *Attorney, Agent, or Firm*—William J. Kubida; Michael C. Martensen; Hogan Lovells US LLP

(57) ABSTRACT

A method of operating a radio-frequency (RF) circuitry and a signal-processing circuitry in a mobile telephone apparatus includes at least partially disabling the signal-processing circuitry while transmitting or receiving signals. In one example, a processor is efficiently disabled by generating and servicing an interrupt of relatively high priority. One advantage of this example is that preexisting, legacy code can be maintained, while still achieving the desired objectives. The processor can be enabled by generating and servicing a second high priority interrupt.

24 Claims, 7 Drawing Sheets

U.S. PATENT DOCUMENTS

| | | | |
|---|---|---|---|
| 5,471,471 A | 11/1995 | Freeburg et al. | |
| 5,471,663 A | 11/1995 | Davis | |
| 5,475,684 A | 12/1995 | Shimizu | |
| 5,487,181 A * | 1/1996 | Dailey et al. | 455/90.2 |
| 5,519,711 A | 5/1996 | Sointula | |
| 5,604,928 A | 2/1997 | Hamano et al. | |
| 5,630,224 A | 5/1997 | Swail | |
| 5,649,160 A | 7/1997 | Corry et al. | |
| 5,758,278 A | 5/1998 | Lansdowne | |
| 5,764,693 A | 6/1998 | Taylor et al. | |
| 5,812,936 A | 9/1998 | DeMont | |
| 5,838,741 A | 11/1998 | Callaway, Jr. et al. | |
| 5,842,037 A * | 11/1998 | Haartsen | 710/1 |
| 5,859,883 A | 1/1999 | Critchlow et al. | |
| 5,872,540 A | 2/1999 | Casabona et al. | |
| 5,875,449 A | 2/1999 | Ono | |
| 5,917,854 A | 6/1999 | Taylor et al. | |
| 5,920,592 A * | 7/1999 | Tanaka et al. | 375/220 |
| 5,923,761 A | 7/1999 | Lodenius | |
| 5,953,640 A | 9/1999 | Meador et al. | |
| 6,020,614 A | 2/2000 | Worley | |
| 6,243,597 B1 | 6/2001 | Daanen | |
| 6,246,335 B1 | 6/2001 | Tsunoda | |
| 6,366,622 B1 | 4/2002 | Brown et al. | |
| 6,442,407 B1 | 8/2002 | Bauer et al. | |
| 6,480,553 B1 | 11/2002 | Ho et al. | |
| 6,498,819 B1 | 12/2002 | Martin | |
| 6,510,185 B2 | 1/2003 | Lee et al. | |
| 6,738,845 B1 * | 5/2004 | Hadwiger et al. | 710/240 |
| 2002/0080728 A1 | 6/2002 | Sugar et al. | |
| 2003/0020521 A1 | 1/2003 | Lee et al. | |
| 2004/0116168 A1 * | 6/2004 | Usui | 455/575.3 |
| 2004/0120435 A1 | 6/2004 | Yang et al. | |
| 2004/0146030 A1 | 7/2004 | Hsieh et al. | |

FOREIGN PATENT DOCUMENTS

| | | |
|---|---|---|
| EP | 00511511 A2 | 11/1992 |
| EP | 00511511 A3 | 11/1992 |
| EP | 00511511 B1 | 11/1992 |
| EP | 00447302 A1 | 5/1994 |
| EP | 00447302 B1 | 5/1994 |
| EP | 0939495 | 9/1999 |
| EP | 00463621 | 1/2000 |
| EP | 00463621 A1 | 1/2000 |
| EP | 00463621 B1 | 1/2000 |
| WO | WO 0139406 | 5/2001 |
| WO | WO 2004021684 A1 * | 3/2004 |

OTHER PUBLICATIONS

International Search Report for PCT/US2005/025909, date of mailing: Nov. 15, 2005, 3 pages.

* cited by examiner

|  | INTERRUPT | PRIORITY |
|---|---|---|
| LEGACY SYSTEM INTERRUPTS | 1 | 0 (HIGHEST PRIORITY) |
|  | 2 |  |
|  | 3 | . |
|  | . | . |
|  | . |  |
|  | N | N-1 (LOWEST PRIORITY) |

FIG. 4

|  | INTERRUPT | PRIORITY |
|---|---|---|
| START/STOP INTERRUPTS | N+2 | -2 (HIGHEST PRIORITY) |
|  | N+1 | -1 |
| LEGACY SYSTEM INTERRUPTS | 1 | 0 |
|  | 2 |  |
|  | 3 | . |
|  | . | . |
|  | . |  |
|  | N | N-1 (LOWEST PRIORITY) |

FIG. 5

METHOD OF CONTROLLING A PROCESSOR FOR RADIO ISOLATION USING A TIMER

CROSS-REFERENCE TO RELATED APPLICATIONS

This patent application relates to, and incorporates by reference, the following U.S. patent applications, which are each incorporated by reference herein: Ser. No. 10/898,058, titled "APPARATUS USING INTERRUPTS FOR CONTROLLING A PROCESSOR FOR RADIO ISOLATION AND ASSOCIATED METHODS", filed on Jul. 23, 2004; Ser. No. 10/898,057, titled "APPARATUS USING INTERRUPTS FOR CONTROLLING A PROCESSOR FOR RADIO ISOLATION AND ASSOCIATED METHODS", filed on Jul. 23, 2004.

FIELD OF THE INVENTION

This patent document relates generally to real-time systems and, more particularly, to systems and methods for controlling real-time systems, such as a highly integrated RF system.

BACKGROUND OF THE INVENTION

In various types of circuits, interference can cause problems with the operation of the circuits. These types of problems may be especially evident in highly integrated systems, where the operation of one portion of a device can interfere with the operation another portion of the device. For example, in a circuit containing both RF circuitry and digital circuitry, interference between the RF and digital circuitry can cause significant disturbance to the RF circuits, making the implementation on an integrated circuit very difficult.

In a typical prior art RF receiver, transmitter, or transceiver, RF circuitry generally resides in a different circuit partition (e.g., integrated circuit (IC), die, etc.) than does signal-processing circuitry (e.g., baseband), partly due to the problem of interference. RF circuitry typically includes analog circuitry that has a relatively high sensitivity to noise and interference. Furthermore, the RF circuitry in some applications, for example, in a mobile telephone apparatus, may have to detect signals as small as a few nano-volts in amplitude. The performance of a device may suffer as a result of noise and interference from sources external or even internal to the communication apparatus.

In a typical communication apparatus, such as a mobile telephone apparatus, digital circuitry produces digital signals with relatively small rise and fall times, or with fast transitions or sharp edges. Furthermore, those signals often have relatively high frequencies. As a result, these high frequency signals, and their harmonics, can interfere with, and adversely impact the performance of, the RF circuitry. As a result, typical prior art communication devices use more than one circuit partition. For example, one partition may include the RF circuitry, while a second partition includes the digital circuitry.

Using more than one partition for RF circuitry and the digital circuitry, however, has several disadvantages, such as increased component count, size, and overall cost, and more potential for decreased reliability and increased manufacturing failures. Therefore, a need exists for highly integrated devices having all circuitry in one partition. For example, in the field of RF communication devices, there is a need for a highly integrated RF apparatus that includes a complete radio in one partition, die, IC, etc.

SUMMARY OF THE INVENTION

This invention contemplates methods relating to highly integrated RF apparatus. In one embodiment, a method according to the invention of controlling a mobile telephone apparatus, includes between bursts, using a processor to process signals received during a previous burst and to prepare signals for the next burst, using a timer to determine when a burst begins, and at least partially disabling the processor to minimize noise in the apparatus during the burst.

In another embodiment, a method of minimizing interference between a transceiver formed on an integrated circuit and digital circuitry formed on the same integrated circuit includes operating the digital circuitry in a first mode of operation when the transceiver is not transmitting or receiving signals, operating the digital circuitry in a second mode when the transceiver is transmitting or receiving signals, and using a timer to determine the timing of the transition from the first mode the second mode.

In another embodiment, a method of controlling a mobile telephone apparatus having a processor and a transceiver includes using the processor to process information in preparation for transmission or reception of RF signals, using a timer to determine the timing of the transmission or reception of RF signals, before the transmission or reception of RF signals, disabling at least a portion of the processor to reduce interference between the processor and the transceiver, activating the transceiver to facilitate the transmission or reception of RF signals, deactivating the transceiver after the transmission or reception of RF signals, and enabling the processor after the transceiver is deactivated.

Other features and advantages of the present invention will be apparent from the accompanying drawings and from the detailed description that follows below.

BRIEF DESCRIPTION OF THE DRAWINGS

The present invention is illustrated by way of example and not limitation in the figures of the accompanying drawings, in which like references indicate similar elements and in which:

FIG. 4 is a diagram illustrating an interrupt map.

FIG. 5 is a diagram illustrating an interrupt map, including two new interrupts used to trigger the stopping and starting of a processor.

DETAILED DESCRIPTION

This invention relates to highly integrated RF and digital systems. In one application of the invention, the concepts described below obviate the need for partitioning RF circuitry and digital circuitry (e.g., signal-processing circuitry), as well as address challenges relating to such integration. In one exemplary embodiment of the present invention, in a communication system, RF circuitry and signal-processing circuitry (e.g., digital signal processor (DSP), microprocessor, microcontroller, general-purpose logic circuitry, and the like) may reside in the same circuit partition. Of course, the present invention may be used with any other desired system or device.

Generally, in one example, one aspect of the present invention relates to time-domain isolation of different parts of an apparatus (e.g., isolating RF circuitry from digital circuitry in time). In an example of a communication system having signal processing circuitry and RF circuitry, the RF circuitry generally operates when the signal-processing circuitry is inactive, and vice-versa. Note, however, that the operation of the RF circuitry and the signal-processing circuitry may overlap by some amount. As a consequence, the digital switching noise and associated harmonic content do not interfere with the performance of the RF circuitry, and vice-versa. Another aspect of the present invention relates to techniques for efficiently stopping and starting signal processing circuitry to achieve the time-domain isolation mentioned above.

In order to provide a context for understanding this description, the following description illustrates one example of an environment in which the present invention may be used. Of course, the invention may also be used in many other types of environments (e.g., a real-time operating system based system). Techniques of the present invention may be used for any desired applications, including a wireless transmission system such as mobile or cellular communication devices or other wireless devices.

Examples of systems where the present invention may be used include but are not limited to, Global System for Mobile communications (GSM), General Packet Radio Service (CPRS), Enhanced Data rates of GSM Evolution (EDGE), Time Division Multiple Access (TDMA), Personal Communications Service (PCS), Personal Communications System (PCS), or any similarly configured communication system.

Figure 1:
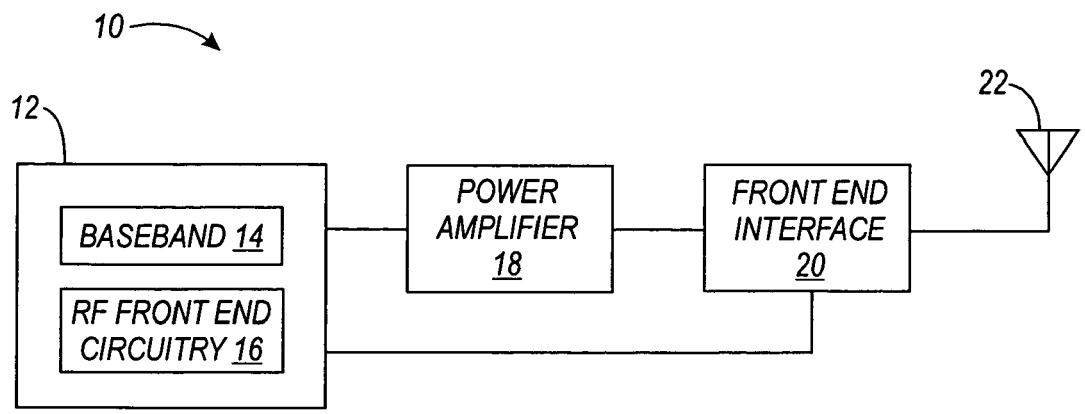
FIG. 1 is a block diagram of a mobile communication apparatus.

FIG. 1 is a block diagram of a mobile communication apparatus 10. Note that FIG. 1 shows the apparatus 10 generally, and that such an apparatus will include various other components, as persons of ordinary skill in the art who have the benefit of the description of the invention understand. The apparatus 10 shown in FIG. 1 includes a circuit partition 12 (e.g., an integrated circuit (IC), die, multi-chip module, package, EMI cavity, etc.), including a baseband 14 and RF front-end circuitry 16 (as well as other digital and RF circuitry). The baseband 14 generally functions to control the operation of the apparatus 10, and may include microcontroller, digital signal processors, logic circuits, memory, etc. A processor or controller may be comprised of a multiple processors, i.e., a plurality of processing elements. The RF front-end circuitry 16 generally provides an interface to a power amplifier 18 (to facilitate the transmission of signals) and the front-end interface 20 (for the routing of signals to and from the antenna). Of course, the circuit partition 12 includes various other digital and RF circuitry, as persons of ordinary skill in the art who have the benefit of the description of the invention understand. When transmitting signals, the power amplifier 18 provides amplified signals to the front-end interface 20, which then provides the amplified signals to the antenna 22. When receiving signals, signals are received by the antenna 22, and sent to the RF front-end circuitry 16 via the front-end interface 20.

Figure 2:
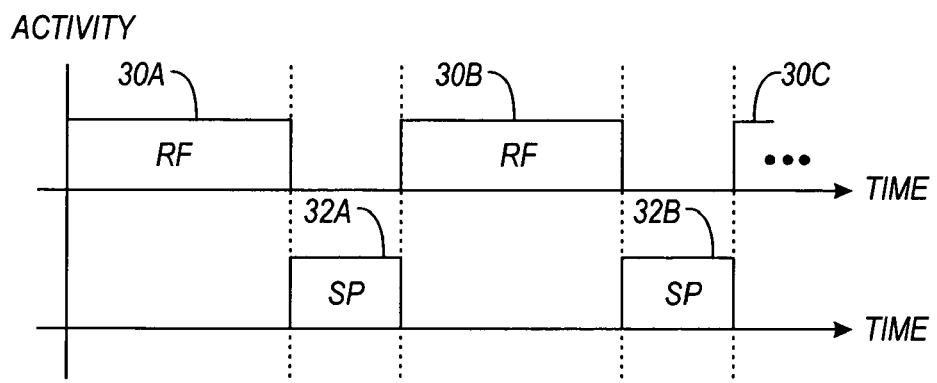
FIG. 2 shows a set of events that occur in a general communication system according to the invention.

FIG. 2 illustrates a set of events that occur in a general communication system according to the present invention. The example shown in FIG. 2 relates to a system that operates according to a TDMA protocol. Broadly speaking, two alternate events take place in this example: RF reception or transmission, and signal processing. Put another way, the system arranges in time the RF reception or transmission activities and the signal-processing activities so as to avoid or reduce interference between the RF circuitry and the digital signal-processing circuitry.

Referring to FIG. 2, communication systems or apparatus according to exemplary embodiments of the invention use a plurality of RF time-slots 30A, 30B, 30C, and so on. Such systems or apparatus also employ a plurality of signal-processing time-slots 32A, 32B, and so on. Generally, during RF time-slots 30A-30C, the system or apparatus (e.g., the RF front-end circuitry 16 shown in FIG. 1) may receive RF signals or transmit RF signals, process the received signals, and perform any other desired manipulation of the data. Subsequently, during signal-processing time-slots 32A-32B, the system or apparatus (e.g., the baseband 14) may perform signal-processing tasks.

Alternatively, during RF time-slots 30A-30C, the system or apparatus may transmit RF signals. In this mode of operation, during signal-processing time-slots 32A-32B, the system or apparatus (e.g., the baseband 14) performs signal-processing tasks (e.g., voice, data) and performs any other desired manipulation of the data. Subsequently, during RF time-slots 30A-30C, the system or apparatus (e.g., the RF front-end circuitry 16) may process transmit signals and perform RF operations (for example, up-conversion) and transmit an RF signal.

Note that the signal-processing tasks performed during signal-processing time-slots 32A-32B constitute various signal-processing functions in an RF communication apparatus. Examples of such tasks include modulation, coding, decoding, and the like. Also note that depending on the specific protocol, architecture, and circuitry used, the system or apparatus may receive and transmit simultaneously, as desired. Typically, though, the system either transmits signals or receives signals during any of the RF time-slots, or in bursts. For example, a GSM-compliant system or apparatus, such as a mobile telephone, either receives or transmits RF signals in one or more bursts of activity during RF time-slots. Note that the RF and signal processing time-slots can overlap or otherwise vary from that shown in FIG. 2. Also, the positions of the RF or signal processing time-slots in a GSM frame may change over time.

Note that the RF time-slots 30A-30C shown in FIG. 2 may have the same or different durations, as desired. Generally, the RF time-slots 30A-30C may have unequal lengths so as to accommodate a wide variety of circuitry, systems, protocols, and specifications, as desired. Each of the RF time-slots 30A-30C may include several other time-slots or a frame, depending on the particular communication protocol or technique used. For example, in a GSM application, each RF period may include a GSM slot, multiple slots, or multiple frames used to transmit, receive, or monitor.

Similarly, the signal-processing time-slots 32A-32B shown in FIG. 2 may have similar or dissimilar durations, as desired. Generally, the signal-processing time-slots may have unequal lengths so as to accommodate a broad array of signal-processing apparatus, circuitry, algorithms, and processing techniques. Each of signal-processing time-slots 32A-32B may include several other time-slots or time divisions, depending on the particular communication protocol and/or signal-processing techniques and the particular circuitry and technology used. For example, a signal-processing time-slot may include several time-slots, with a portion of a particular circuitry active or processing signals during one or more of the time-slots.

Furthermore, the signal-processing tasks may be performed in a serial or multiplexed manner (e.g., by sharing hardware to perform a variety of tasks), in a parallel manner (e.g., by using dedicated hardware for each signal-processing task), or in a combination of the two techniques, as desired. The choice of signal-processing hardware, firmware, and software depends on the design and performance specifications for a given desired implementation, as persons of ordinary skill in the art who have the benefit of the description of the invention understand.

To accomplish the isolation illustrated in FIG. 2, the RF circuitry and the signal-processing circuitry can be activated and deactivated, in correspondence with transitions from one time-slot to another. The activation and deactivation may be accomplished in a variety of ways. As mentioned above, another aspect of the present invention relates to techniques for efficiently stopping and starting processors and other circuitry.

Efficiently starting and stopping a general purpose processor and/or a digital signal processor presents several challenges. It is desirable to safely stop a processor with minimum latency, so that a maximum amount of time can be allocated for processing tasks while the radio (or other RF circuitry) is not in use. Simply stopping a clock to a processor may leave the processor (as well as the processor bus, memories, or peripheral devices) in an invalid state, or a state which may not be capable of returning to normal operations. By carefully implementing a stopping procedure (e.g., the procedures described below), the buses are well suited for data movement. In addition, with an efficient stopping procedure, time spent before the radio use can be used more effectively, where tasks required in preparation for radio use can occur as close to the start of the radio use as possible. In one example, the state of the processors while the radio is used is maintained, but can also be transitioned quickly back to normal operation after use of the radio. An efficient processor restarting procedure will minimize the time that the processor will spend restarting, allowing more time for processing other tasks.

When implementing stopping and starting procedures, there are several considerations that can be taken into consideration. Again, as described above, in order to maintain the best possible RF performance, noise associated with digital logic switching should be controlled during critical times (e.g., when a radio is transmitting or receiving). One method to control the digital switching noise is to stop all of the switching, or at least minimize it. Ideally, the stopping and starting techniques should be safe for the overall system, such that the states of the processor pipelines are not impacted by spurious clocks, for example. It is also desirable to stop the processor at a specific time, since use of the radio is dictated by a prescribed schedule. It is desirable to stop the processor as quickly as possible in order to maximize the amount of time that the processor is available to process tasks.

While the techniques of the present invention for efficiently stopping and starting one or more processors can be implemented in a number of ways, following is a description of techniques for stopping and starting a processor that is controlled using an interrupt architecture. Generally, an interrupt is a signal received by a processor that causes a temporary halt in the execution of a program while some other task is performed. After the task is performed, control returns to the original program. If multiple interrupts are received, the interrupts are serviced based on a priority system, where the highest priority interrupts are serviced first. It is common for a real time system (e.g., a mobile telephone, etc.) to utilize interrupts to control the operation of the system. Such a system may include a processor, an interrupt handler program, an interrupt controller, and a sequencer, or interrupt generator.

Figure 3:
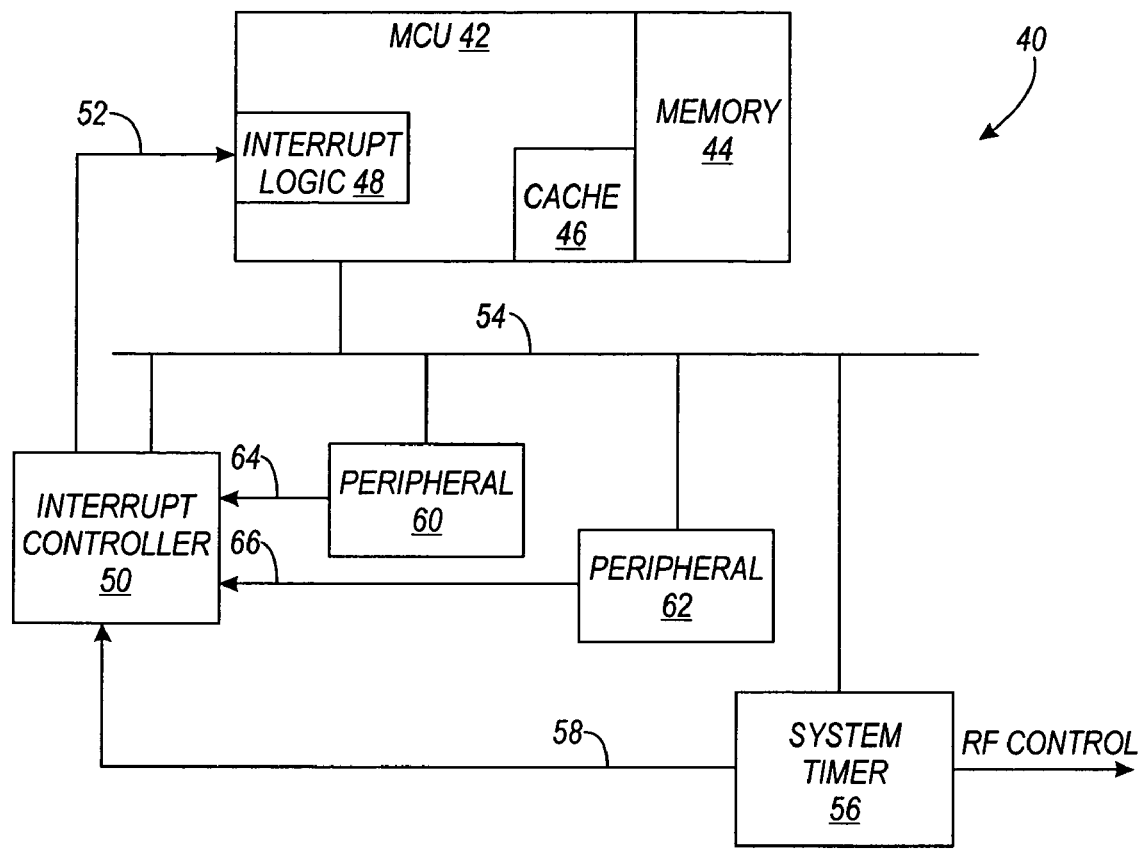
FIG. 3 is a block diagram of an interrupt control system that may be used with the present invention.

FIG. 3 is a block diagram of an interrupt control system 40 that may be used with the present invention. The system 40 includes a microcontroller (MCU) 42, which may be part of the baseband 14 shown in FIG. 1. The MCU 42 shown in FIG. 3 includes memory 44, cache 46, and interrupt logic 48. The memory 44 and cache 46 are used for storing information for use by the MCU 42. The MCU 42 may also make use of memory or cache connected externally. The interrupt logic 48 is coupled to an interrupt controller 50 by line 52. The interrupt controller 50 is also coupled to an MCU bus 54, which is also coupled to the MCU 42. A system timer 56 is also coupled to the MCU bus 54, as well as to the interrupt controller 50, via line 58. The system timer 56 acts as a sequencer, or interrupt generator for generating interrupts for the interrupt controller 50. FIG. 3 also shows two representative peripheral devices 60 and 62, which are coupled to the MCU bus 54 and to the interrupt controller 50 via lines 64 and 66, respectively. Any desired number of peripherals supported by the system may be used.

Examples of peripheral devices include, but are not limited to, a Universal Asynchronous receiver/transmitter (UART), a Subscriber Identity Module (SIM) card interface, a Direct Memory Access (DMA) controller, external interrupt sources, etc.

In the embodiment shown in FIG. 3, interrupts can be generated by the system timer 56, peripheral devices 60 and 62, as well as other devices that may not be shown in FIG. 3. When one or more interrupts are received by the interrupt controller 50, the interrupt controller 50 determines what processing path to take next, at least partly depending on the relative priorities of received interrupts. The interrupt controller 50 then sends control signals the interrupt logic 48 of the MCU 42 via line 52.

Generally, the present invention efficiently stops and starts a processor by (1) providing a way to trigger a transition; and (2) providing procedures to efficiently stop and start the processor. In one example, a transition is triggered by generating and servicing an interrupt of relatively high priority (described in more detail below). One advantage of using this triggering technique, is that preexisting, legacy code can be maintained, while still achieving the desired objectives. Upon receiving the interrupt of relatively high priority, the processor is stopped or started such that the processor can operate in a normal, processing mode, and in a low noise, low power, sleep-like state mode (described in more detail below).

In one example, the present invention configures a first interrupt of relatively high priority that will be generated when the processor is to be stopped (i.e., immediately before radio use). A second interrupt of relatively high priority is configured which will be generated when the processor is to be restarted (i.e., immediately after radio use). FIG. 4 is a diagram illustrating a typical legacy interrupt map. FIG. 4 lists N interrupts (labeled 1 through N), sorted by priority, where interrupt 1 has the highest priority, and interrupt N has the lowest priority. The priorities of the interrupts are labeled 0 through N−1, where the lowest numbers correspond to the highest priorities.

As mentioned above, the present invention can be implemented without disturbing preexisting legacy code (i.e., code corresponding to the N interrupts illustrated in FIG. 4). FIG. 5 is a diagram illustrating an interrupt map, including two new interrupts used to trigger the stopping and starting of the processor. Like FIG. 4, FIG. 5 lists the N legacy interrupts (labeled 1 through N). Two new interrupts (N+1 and N+2) are also shown. The new interrupts (N+1 and N+2) are re-mapped such that they have the highest priorities. In this example, interrupt N+1 has a priority of −1, which is higher than all of the normal, legacy interrupts. Interrupt N+1 can also be thought of as the "−1 interrupt". In one example, interrupt N+1 triggers a shut down interrupt routine (described below) and is generated prior to radio use. Interrupt N+2 has a priority of −2, which is higher than all of the normal, legacy interrupts, as well as interrupt N+1. Interrupt N+2 can be thought of as the "−2 interrupt". In one example, interrupt N+2 triggers a restart interrupt routine (described below) and is generated after radio use. Note that the terms "−1 interrupt" and "−2 interrupt" are merely just convenient names given to the interrupts and that other nomenclature can be used, as desired. Generally, the two new interrupts are configured to have a higher priority than all of the legacy interrupts.

Figure 6:
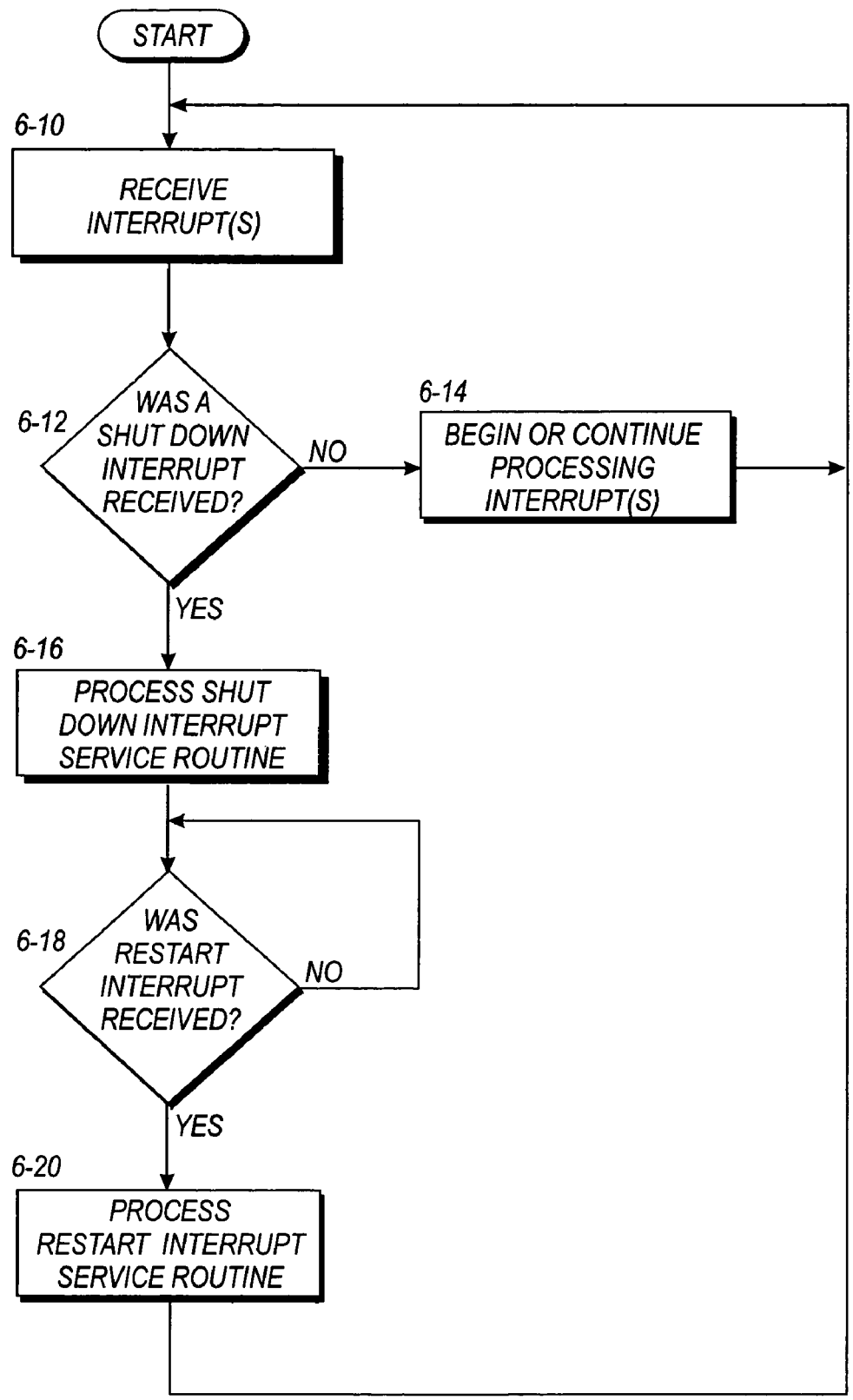
FIG. 6 is a flowchart illustrating the operation of the present invention.

As mentioned, the present invention may use any desired procedures for starting and stopping a processor. FIG. 6 is a flowchart illustrating the operation of the present invention. The process begins with step 6-10, where one or more interrupts are generated and received by the interrupt controller. Generally, as interrupts are received, the interrupt controller will make a decision as to the next processing step that the processor will take. If multiple interrupts are received, the interrupt with the highest priority will be serviced first. At step 6-12, the process determines whether a shut down interrupt (e.g., the −1 interrupt described above) was received. If not (i.e., a normal, legacy interrupt was received), the process proceeds to step 6-14, where the new interrupt is processed. In the case where a previously received higher priority interrupt has not yet been completed, this processing is continued. The process the goes back to step 6-10. Note that, between received interrupts, the processor is performing general processing tasks. If, at step 6-12, it was determined that a shut down interrupt (−1 interrupt) was received (i.e., usage of RF circuitry is about to start), then the process proceeds to step 6-16, where the shut down interrupt service routine is processed.

Figure 7:
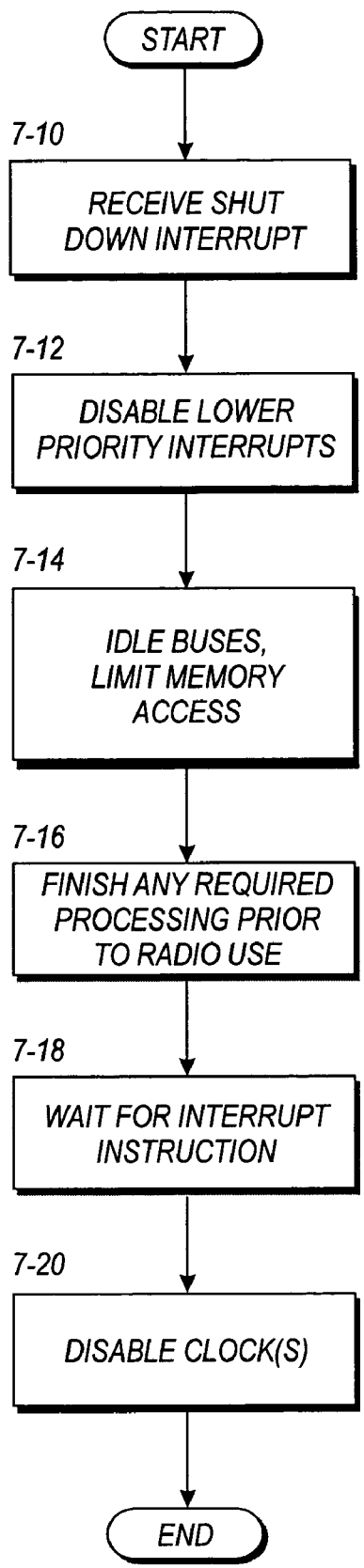
FIG. 7 illustrates an embodiment of the reception of a shut down interrupt and a shut down interrupt service routine.

FIG. 7 (described below) illustrates one embodiment of a shut down interrupt service routine. As is described below with respect to FIG. 7, after step 6-16, the process waits for a restart interrupt (the −2 interrupt). In one example, the −2 interrupt is unmaskable, so the interrupt can not be masked within the interrupt controller. Once a restart interrupt is received, the process proceeds to step 6-20, where the restart interrupt service routine is processed.

Figure 8:
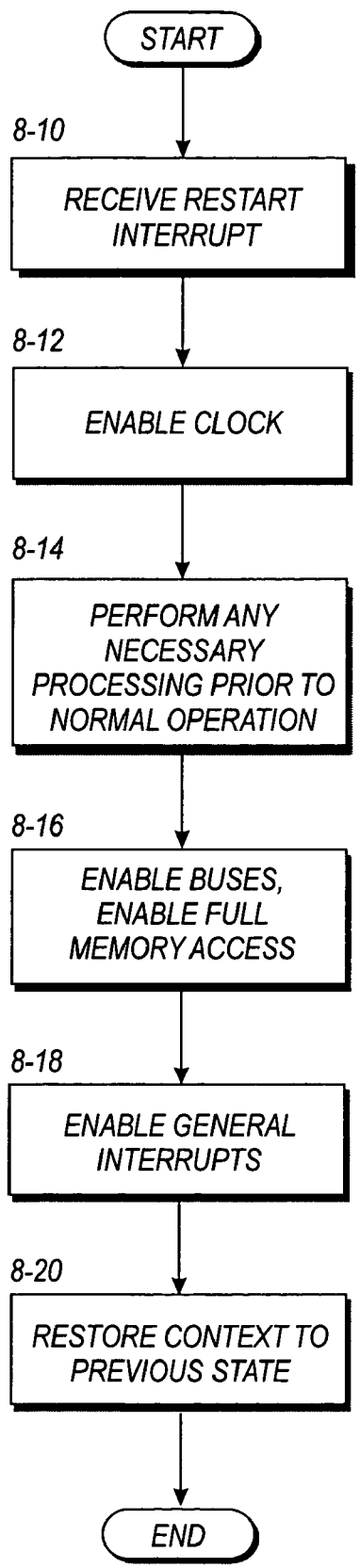
FIG. 8 illustrates an embodiment of the reception of a restart interrupt and a restart interrupt service routine.

FIG. 8 (described below) illustrates one embodiment of a restart interrupt service routine. In an alternative example, rather than using the −2 interrupt, a timer can be used to trigger the restart process, since the length of the RF time-slot should be known. Similarly, a timer could be used to determine when a burst begins, or can be used to trigger the −1 interrupt. After the restart interrupt service routine has completed, the process goes back to step 6-10. Note that the process illustrated in FIG. 6 shows just one example, and that many other examples are possible within the spirit and scope of the present invention.

FIG. 7 illustrates an embodiment of the reception of a shut down interrupt and a shut down interrupt service routine. The main purpose of the shut down interrupt service routine is to quickly transition the processor to a known stable state. In this example, the process begins at step 7-10 where the shut down interrupt was received. At step 7-12, the ability to generate lower priority interrupts (e.g., the normal, legacy interrupts 1–N shown in FIG. 4) is disabled. The purpose of this step is to prevent additional interrupts from being sent to the processor while the radio is being used, causing the processor restart unexpectedly.

Next, at step 7-14, any unneeded buses may be idled. Similarly, the ability to access memory (e.g., RAM) is limited to the processor. In addition, if desired, any peripheral devices that are not designed to operate during use of the radio can be isolated from the processor. Isolating peripheral devices from the processor can be achieved in response to the shut down interrupt, or can be achieved separately from the process outlined in FIG. 7. Examples of techniques for idling a bus and isolating peripheral devices are described in U.S. patent application Ser. No. 10/814,426, filed on Mar. 3, 2004, titled "COMMUNICATION APPARATUS IMPLEMENTING TIME DOMAIN ISOLATION WITH RESTRICTED BUS ACCESS", which is incorporated by reference herein.

At step 7-16, the processor finishes any required processing needed to prepare for radio use. Next, at step 7-18, the processor is instructed to wait for an interrupt. The wait for interrupt instruction is a general instruction that causes the processor to essentially stall until such time as an interrupt is received by the processor. Since no lower priority interrupt can be generated, the normal operations of the processor are stopped. In another example, the processor can be stalled by instructing the processor to wait for a bit to be set. The combination of these tasks results in a quiet processor environment.

Since there are no further operations on the processor, the processor clock can be disabled (step 7-20) without the need to precisely coordinate the clock stop time between the processor, the processor's bus, memories, and peripherals. This essentially decouples the clock stopping and starting from the processor stopping and starting. There are numerous ways of disabling a clock signal. In one example, a clock signal can be disabled by gating a clock source. In another example, a clock signal can be disabled by removing the assertion of a clock enable from state holding elements. Note that the steps outlined in FIG. 7 may be performed in a different order, as desired. Also, not all of the steps are required, depending on the system, noise requirements, etc. Similarly, other steps could also be included in the process.

In another example, a processor can be disabled by simply stopping the processor clock, and hoping that all is well when the clock signal returns. This method would seem to be less reliable than the method illustrated in FIG. 7. In another example it is possible that the code is in the correct function to stop the processor at precisely the right time to stop the processor in the same manner described, through the use of the wait for interrupt instruction. In this example, the method relies on the tasks executed on the processor to be synchronized to the network timebase. While this method would work, a new software protocol may be required for implementation. If the use of a simple clock stop is attempted, it would be possible to have synchronization of all clock domains to ensure that no domain received additional clocks relative to the others.

FIG. 8 illustrates an embodiment of the reception of a restart interrupt and a restart interrupt service routine. The main purpose of the restart interrupt service routine is to restart the processor as quickly as possible. Since the processor has been instructed to wait for an interrupt, and the general purpose interrupts are disabled, then the processor will wait until the restart interrupt is received. In this example, the process begins at step 8-10, where the restart interrupt is received. At step 8-12, the processor clock is enabled, and clocking is restored to the internal circuitry of the processor. At step 8-14, any necessary processing is performed prior to returning to normal operation. In addition, the processor may perform data movement operations that may be required to satisfy peripheral data movement needs. Next, at step 8-16, any disabled buses may be enabled. Also, full memory access may be enabled. The peripheral devices are enabled at this time to use system resources. At step 8-18, the general interrupts are enabled. Finally, at step 8-20, the context is restored to the normal system task that was running immediately prior to the radio use interrupts. Note that the steps outlined in FIG. 8 may be performed in a different order, as desired. Also, not all of the steps are required, depending on the system, noise requirements, etc. Similarly, other steps could also be included in the process.

Figure 9:
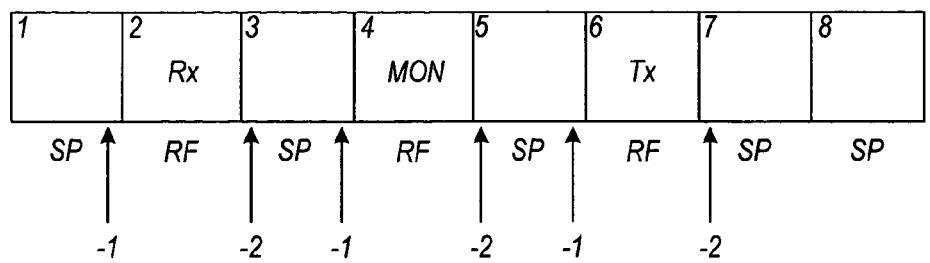
FIG. 9 shows an example of a GSM data frame and the relative timing of the shut down and restart interrupts.
Figure 10:
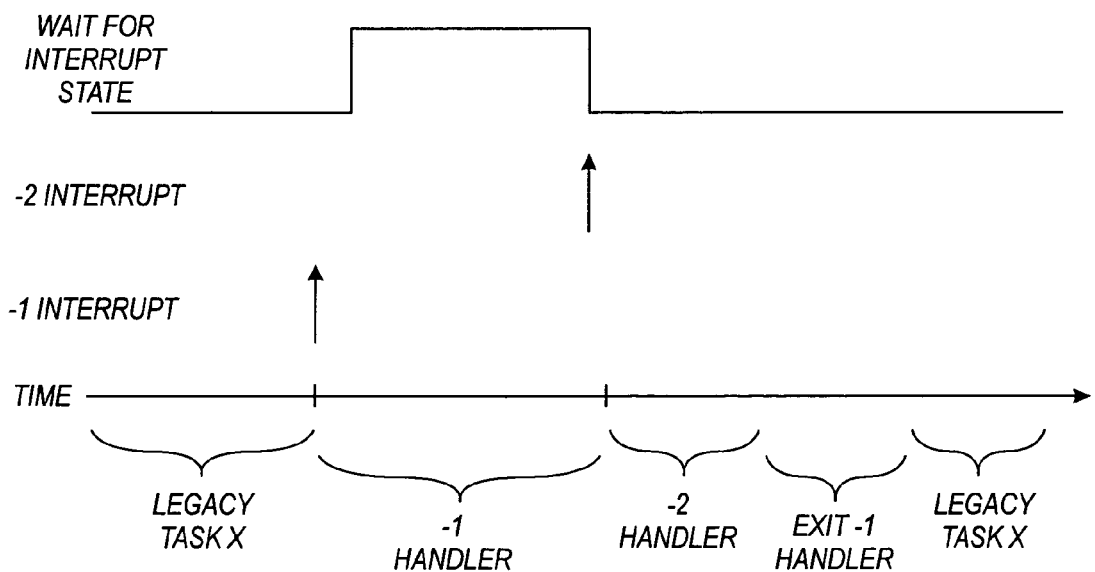
FIG. 10 is a timing diagram illustrating the system operation context for an RF time-slot.

Referring more specifically to the example of a GSM application, FIG. 9 shows an example of a GSM data frame 70 and the relative timing of the shut down and restart interrupts. Frame 70 includes 8 slots, which may correspond to bursts of data. In one example, for GSM speech, slot 2 represents a receive slot, slot 4 is a monitor slot, and slot 6 constitutes a transmit slot. The remaining slots are unused for RF activity. Of course, the transmit, receive, and monitor slots could also be in different positions. In addition, it is possible to have multiple transmit or receive slots in the same frame. In the GSM frame example, and referring to the discussion of FIG. 2 above, the GSM slots 2, 4, and 6 are RF time-slots, with the remaining slots, in the context of this example, being signal-processing time-slots. For each of the RF time-slots, FIG. 9 also shows the relative timing of the −1 and −2 interrupts (a more detailed view of the relative timing of the −1 and −2 interrupts is shown in FIG. 10). As shown, the −1 interrupt is generated slightly before the beginning of each RF time-slot, due to the time required to process the shut down interrupt service routine (see FIG. 7). Similarly, the −2 interrupt is generated after the end of each RF time-slot to restart the processor. The precise timing of the interrupts can vary, as desired.

FIG. 10 is a timing diagram illustrating the system operation context for an RF time-slot. Note that the diagram in FIG. 10 is not to scale, and is used to merely to illustrate the relative timing of the various items shown. In FIG. 10, the top line represents the wait for interrupt state, which begins during the shut down interrupt service routine (step 7-18 of FIG. 7) and ends when the −2 restart interrupt is received (step 8-10 of FIG. 8). As shown in FIG. 10, prior to the −1 interrupt, the system processes normal, legacy tasks. At some time between the −1 interrupt, the −2 interrupt, the RF circuitry is in use, and the −1 handler puts the processor in a sleep-like state. The −2 interrupt initiates the −2 handler, which restarts the processor. Part of the function of the −2 handler is to end the −1 handler. Finally, the system again processes normal, legacy tasks.

From the preceding description it is apparent that the present invention can be implemented in many ways to provide various advantages. One novel advantage of the present invention is that the invention provides a processor able to minimize noise created by digital circuitry. Another advantage of the present invention is the provision of the ability to quickly transition from high performance processing to low noise modes and back, with a minimum amount of overhead. In addition, the low noise modes cannot be accidentally exited, although it could be exited earlier than originally expected.

In the preceding detailed description, the invention is described with reference to specific exemplary embodiments thereof. Various modifications and changes may be made thereto without departing from the broader spirit and scope of the invention as set forth in the claims. The specification and drawings are, accordingly, to be regarded in an illustrative rather than a restrictive sense.

What is claimed is:

1. A method of controlling a mobile telephone apparatus that transmits and receives signals in bursts occurring at predetermined intervals, the method comprising:
   between bursts, using a processor to process signals received during a previous burst and to prepare signals for the next burst;
   using a timer to determine when a burst begins;
   responsive to determining when the burst begins, providing a first interrupt having a first priority that is higher priority than a priority of each interrupt of a set of interrupts;
   responsive to the first interrupt, disabling at least a portion of the processor to minimize noise in the apparatus during the burst;
   determining when the burst ends;
   providing a second interrupt having a second priority that is higher priority than the first priority; and
   responsive to the second interrupt, enabling the disabled portion of the processor.

2. The method of claim 1, further comprising using the timer to determine when the burst ends, and enabling the processor after the burst.

3. The method of claim 1, wherein the processor is put into a sleep-like mode during the bursts.

4. The method of claim 1, wherein one or more clock signals are disabled during the bursts.

5. The method of claim 1, wherein one or more data buses are disabled during the bursts.

6. The method of claim 1, wherein access to data stored in a memory is limited during bursts.

7. The method of claim 6, wherein access to data stored in a memory is limited to the processor during bursts.

8. The method of claim 1, wherein the apparatus is controlled using a plurality of interrupts, and wherein at least some of the interrupts are disabled during bursts.

9. A method of minimizing interference between a transceiver formed on an integrated circuit and digital circuitry formed on the same integrated circuit, the method comprising:
   operating the digital circuitry in a first mode of operation when the transceiver is not transmitting or receiving signals wherein the first mode of operation includes a first interrupt having a first priority that enables the transceiver;
   operating the digital circuitry in a second mode when the transceiver is transmitting or receiving signals wherein the second mode of operating includes a second interrupt having a second priority that disables the transceiver from transmitting or receiving signals, the second priority being lower than the first priority; and
   using a timer to determine when to transition from the first mode to the second mode.

10. The method of claim 9, wherein portions of the digital circuitry are disabled when operating in the second mode to minimize interference between the digital circuitry and the transceiver.

11. The method of claim 9, further comprising disabling one or more clock signals coupled to the digital circuitry when operating in the second mode.

12. The method of claim 9, further comprising disabling one or more data buses coupled to the digital circuitry when operating in the second mode.

13. The method of claim 9, further comprising limiting access to data stored in a memory when operating in the second mode.

14. The method of claim 9, wherein the integrated circuit is part of a mobile telephone apparatus.

15. A method of controlling a mobile telephone apparatus having a processor and a transceiver, the processor and transceiver formed on the same circuit partition, the method comprising:
   using the processor to process information in preparation for transmission or reception of RF signals;
   using a timer to determine a beginning and an end of the transmission or reception of RF signals begins;
   in response to the beginning of the transmission or reception of RF signals, initiating a first interrupt of a first priority disabling at least a portion of the processor to reduce interference between the processor and the transceiver
   in response to the end of the transmission or reception of RF signals initiating a second interrupt of a higher priority than the first interrupt activating the transceiver to facilitate the transmission or reception of RF signals;
   deactivating the transceiver after the transmission or reception of RF signals; and
   enabling the processor after the transceiver is deactivated.

16. The method of claim 15, wherein disabling at least a portion of the processor occurs at a time determined by the timer.

17. The method of claim 15, wherein enabling the processor occurs at a time determined by the timer.

18. The method of claim 15, wherein one or more clock signals are disabled when the transceiver is activated.

19. The method of claim 15, wherein one or more data buses are disabled when the transceiver is activated.

20. The method of claim 15, wherein access to data stored in a memory is limited when the transceiver is activated.

21. The method of claim 20, wherein access to data stored in a memory is limited to the processor when the transceiver is activated.

22. The method of claim 15, wherein the circuit partition is an integrated circuit.

23. The method of claim 15, wherein the circuit partition is an EMI cavity.

24. The method of claim 15, wherein the circuit partition is a multi-chip module.

* * * * *